(12) United States Patent
Kuo

(10) Patent No.: US 10,389,152 B2
(45) Date of Patent: Aug. 20, 2019

(54) POWER SUPPLYING METHOD AND ELECTRONIC DEVICE UTILIZING THE SAME

(71) Applicant: Quanta Computer Inc., Taoyuan (TW)

(72) Inventor: Hsin-Chih Kuo, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 88 days.

(21) Appl. No.: 15/675,963

(22) Filed: Aug. 14, 2017

(65) Prior Publication Data

US 2018/0309310 A1 Oct. 25, 2018

(30) Foreign Application Priority Data

Apr. 24, 2017 (TW) .............................. 106113584 A

(51) Int. Cl.
*H02J 7/00* (2006.01)
*G06F 1/26* (2006.01)
*G06F 1/16* (2006.01)
*H02J 1/10* (2006.01)

(52) U.S. Cl.
CPC .......... *H02J 7/0065* (2013.01); *G06F 1/1632* (2013.01); *G06F 1/263* (2013.01); *G06F 1/266* (2013.01); *H02J 1/108* (2013.01); *H02J 2007/0095* (2013.01)

(58) Field of Classification Search
CPC ......... H02J 7/007; H02J 7/0054; H02J 7/0065
USPC ................................. 320/127, 132, 135, 103
See application file for complete search history.

(56) References Cited

U.S. PATENT DOCUMENTS

| 2012/0280648 A1* | 11/2012 | Hwang | H02J 7/0013 320/108 |
| 2013/0015808 A1* | 1/2013 | Lee | G06F 1/263 320/103 |
| 2015/0340897 A1* | 11/2015 | Uan-Zo-Li | H02J 7/0054 320/103 |

* cited by examiner

*Primary Examiner* — Zixuan Zhou
(74) *Attorney, Agent, or Firm* — McClure, Qualey & Rodack, LLP

(57) ABSTRACT

An electronic device includes a main device and an expansion device with an auxiliary battery device. The main device includes a main battery device, a voltage-directing device, a switch device, a first soft-start device, and a comparison device. The voltage-directing device outputs, through an output terminal, the higher of the voltages at a first input terminal and a second input terminal. The first soft-start device is connected to the auxiliary battery device and outputs a voltage to the second input terminal when the main device is connected to the expansion device. The comparison device controls the switch device to enter an off-state when the voltage at the second input terminal is higher than a reference voltage, and controls the switch device to enter an on-state when the voltage at the second input terminal is not higher than the reference voltage.

10 Claims, 4 Drawing Sheets

POWER SUPPLYING METHOD AND ELECTRONIC DEVICE UTILIZING THE SAME

CROSS REFERENCE TO RELATED APPLICATIONS

This Application claims priority of Taiwan Patent Application No. 106113584, filed on Apr. 24, 2017, the entirety of which is incorporated by reference herein.

BACKGROUND OF THE INVENTION

Field of the Invention

The invention relates to a power supplying method, and more particularly to a power supplying method suitable for a detachable electronic device.

Description of the Related Art

In addition to being thin and lightweight, portability is another important consideration for tablet computers and notebook computers, at least based on consumer demand and the trends of the marketplace for electronic devices. Therefore, detachable tablet computers and detachable notebooks have been developed. Detachable tablet computers include two main parts; the tablet PC (or the main system) plus an expansion base, wherein the main system and the expansion base each have their own battery. However, in order to extend the standby hours of the tablet computers, a method for efficiently controlling the discharge sequence of the batteries in the main system and the expansion base is also a very important design consideration. What kind of discharge behavior should the battery discharge while in the discharge mode (DC mode), and which is the most convenient, friendly and preferable to the user? This is a subject being studied.

In some implementations of tablet computers with transformable shape, the expansion base is designed to provide battery power to the main system (or the main circuit) of the tablet computer first until the battery energy is discharged to a predetermined percentage (e.g., 5% to 10%), and then the battery in the main system is utilized to provide power to the main system (or the main circuit).

However, in order to achieve such a switching discharge behavior, a serious problem is raised in that the device could experience an instantaneous powering off when the expansion base and the main system are being connected to each other or being detached from each other while the tablet computer is turned on.

BRIEF SUMMARY OF THE INVENTION

In order to solve the above problems, the invention discloses an electronic device and a power supplying method thereof, which is a hardware circuit structure that does not need to be monitored by any software. When the main system of the tablet computer is combined with the expansion base, there is a bidirectional soft-start, which can control the discharge sequence of the main battery device of the tablet computer and the auxiliary battery device of the expansion base, to avoid an instantaneous surge current (In-rush current) being generated by the main battery device of the tablet computer or the auxiliary battery device of the expansion base when supplying power to the main system as the tablet computer is being combined with the expansion base. At the same time, a system shutdown due to a hot plug-unplug can also be avoided.

In addition, a reference voltage can be set by the user in the proposed electronic device and power supplying method, to control the discharge sequence of the main battery device of the tablet computer and the auxiliary battery device of the expansion base.

Based on the purpose discussed above, an electronic device and a power supplying method are provided. An exemplary embodiment of an electronic device comprises a main device and an expansion device. The main device is detachably connected to the expansion device. The expansion device comprises an auxiliary battery device. The main device comprises a main battery device, a voltage-directing device, a switch device, a first soft-start device, and a comparison device. The voltage-directing device comprises a first input terminal, a second input terminal and an output terminal, and is configured to output through the output terminal the higher of the voltages at the first input terminal and the second input terminal. The switch device is coupled to the main battery device and the first input terminal. The first soft-start device is configured to connect to the auxiliary battery device and output a voltage to the second input terminal when the main device is connected to the expansion device. The comparison device is configured to receive the voltage at the second input terminal and a reference voltage, control the switch device to enter an off-state when the voltage at the second input terminal is higher than the reference voltage, and control the switch device to enter an on-state when the voltage at the second input terminal is not higher than the reference voltage.

Another exemplary embodiment of an electronic device is detachably connected to an expansion device which comprises an auxiliary battery device that comprises a main battery device, a voltage-directing device, a switch device, a soft-start device, and a comparison device. The voltage-directing device comprises a first input terminal, a second input terminal, and an output terminal, and is configured to output the higher of the voltages at the first input terminal and the second input terminal at the output terminal. The switch device is coupled to the main battery device and the first input terminal. The soft-start device is configured to connect the auxiliary battery device and output a voltage to the second input terminal when the electronic device is connected to the expansion device. The comparison device is configured to receive the voltage at the second input terminal and a reference voltage, control the switch device to enter an off-state when the voltage at the second input terminal is higher than the reference voltage, and control the switch device to enter an on-state when the voltage at the second input terminal is not higher than the reference voltage.

Another exemplary embodiment of a power supplying method is suitable for a main device and an expansion device of an electronic device, wherein the expansion device comprises an auxiliary battery device, and the main device comprises a main battery device, a switch device, a voltage-directing device, a comparison device, and a first soft-start device. The method comprises outputting, through an output terminal of the voltage-directing device, the higher of the voltages at a first input terminal and a second input terminal of the voltage-directing device; using the first soft-start device to connect to the auxiliary battery device and to output a voltage to the second input terminal when the main device is connected to the expansion device; using the comparison device to control the switch device to enter an off-state when the voltage at the second input terminal is higher than a reference voltage provided to the comparison device; and using the comparison device to control the switch device to enter an on-state when the voltage at the second input terminal is not higher than the reference voltage.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
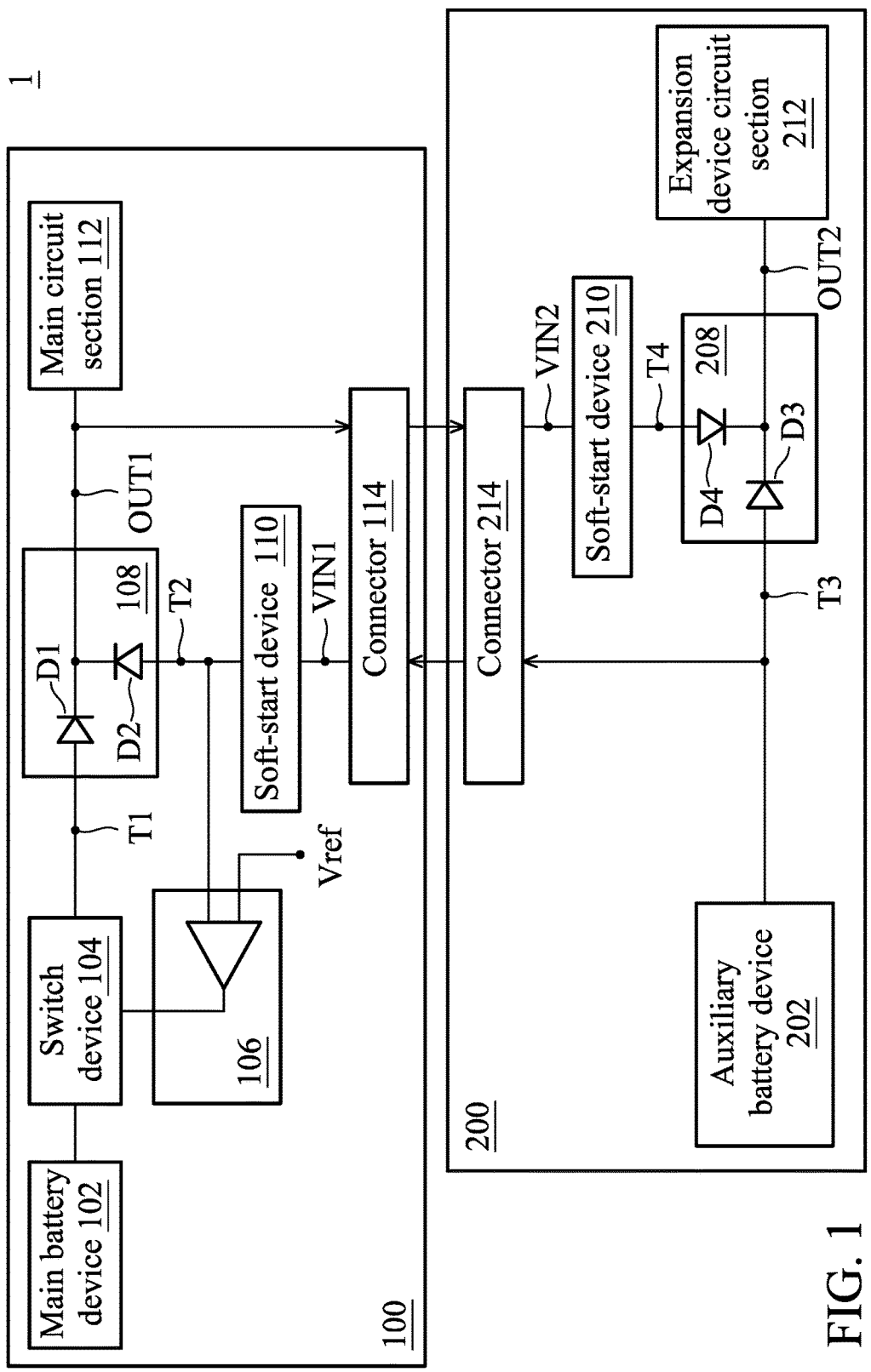
FIG. 1 shows a block diagram of an electronic device 1 according to an embodiment of the invention.

FIG. 1 shows a block diagram of an electronic device 1 according to an embodiment of the disclosure. The electronic device 1 comprises a main device 100 and an expansion device 200. The main device 100 comprises a main battery device 102, a switch device 104, a comparison device 106, a first voltage-directing device 108, a soft-start device 110, a main circuit section 112 and a connector 114. The expansion device 200 comprises an auxiliary battery device 202, a second voltage-directing device 208, a soft-start device 210, an expansion device circuit section 212 and a connector 214. The main device 100 can operate independently without the expansion device 200. However, the main device 100 can also be connected to the expansion device 200 via the connectors 114 and 214 to have the supplementary functions provided by the expansion device 200.

The electronic device 1 may be a detachable tablet computer, an expandable portable computer, or other expandable portable device; wherein the main device 100 may be a tablet computer and the expansion device 200 may be an expansion base (or expanded keyboard device). The main battery device 102 and the auxiliary battery device 202 may be a general lithium battery Li having a rated voltage of about 3.7 volts (V) for supplying power to the main circuit section 112 and/or the expansion device circuit section 212, but note that the disclosure should not be limited thereto. The first voltage-directing device 108 comprises a first input terminal T1, a second input terminal T2, and an output terminal OUT1, and is configured to output the higher of the voltages at the first input terminal T1 and the second input terminal T2 at the output terminal OUT1. Similarly, the second voltage-directing device 208 comprises a third input terminal T3, a fourth input terminal T4, and another output terminal OUT2, and is configured to output the higher of the voltages at the third input terminal T3 and the four input terminal T4 at the output terminal OUT2. In one embodiment of the disclosure, the first voltage-directing device 108 is a diode device comprising a first diode D1 and a second diode D2. The cathodes of the first diode D1 and the second diode D2 are connected to the output terminal OUT1. The anodes of the first diode D1 and second diode D2 are connected to the first input terminal T1 and the second input terminal T2, respectively. The switch device 104 is a switching circuit. In one embodiment of the disclosure, the switch device 104 is coupled to the main battery device 102 and the first input terminal T1. In another embodiment of the disclosure, the switch device 104 is physically connected between the main battery device 102 and the first input terminal T1. The state of the switch device 104 is determined based on the signal received from the comparison device 106. For example, if the signal received from the comparison device 106 is a turn-on signal, the switch device 104 is in an on-state; if the signal received from the comparison device 106 is a turn-off signal, the switch device 104 is in an off-state. In this embodiment, the comparison device 106 is a comparator which is the electronic component that compares the current or voltages at the two input terminals and outputs different voltages at the output terminal based on the comparison results. In one embodiment of the disclosure, the comparison device 106 receives the voltage at the second input terminal T2 and a reference voltage Vref. The reference voltage Vref may be set to a predetermined percentage of a value of the minimum operating voltage of the main device 100 or a rated voltage of the auxiliary battery device 202. When the voltage at the second input terminal T2 is higher than the reference voltage Vref, the comparison device 106 transmits a turn-off signal to control the switch device 104 to enter an off-state. When the voltage at the second input terminal T2 is not higher than (that is, lower than or equal to) the reference voltage Vref, the comparison device 106 transmits a turn-on signal to control the switch device 104 to enter an on-state.

Figure 2A:
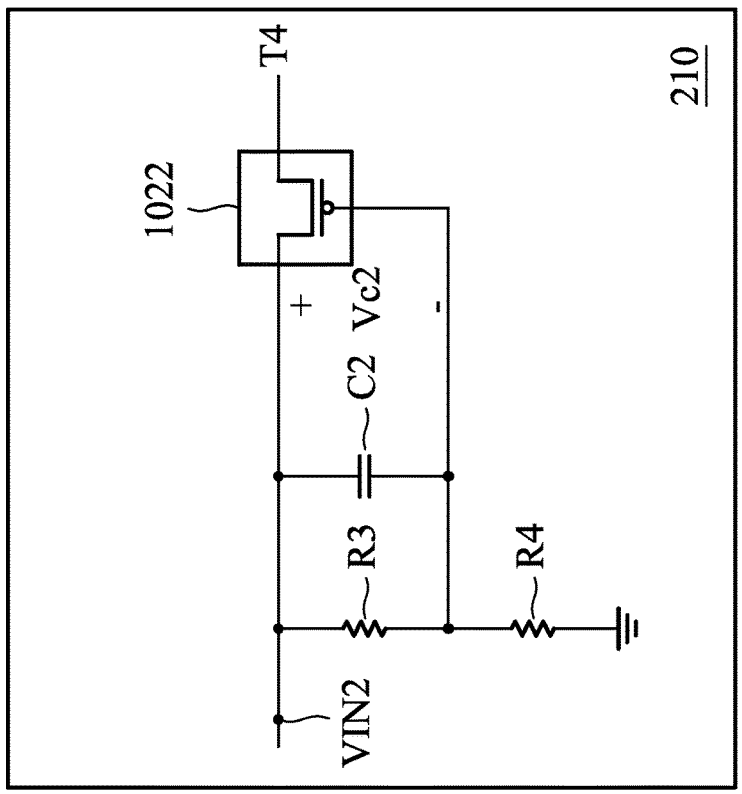
FIG. 2A is a block diagram of the soft-start device 110 according to an embodiment of the invention.
Figure 2B:
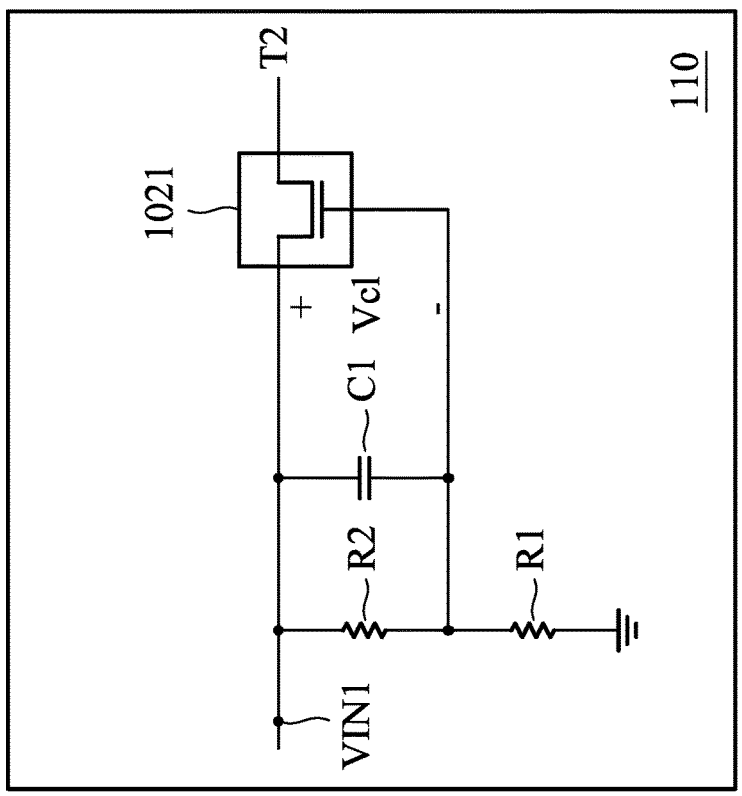
FIG. 2B is a block diagram of the soft-start device 210 according to an embodiment of the invention.

The details of the soft-start devices 110 and 210 are shown in FIGS. 2A and 2B. When the main device 100 is connected to the expansion device 200, the input terminal of the soft-start device 110 is coupled to the auxiliary battery device 202 (for example, the voltage VIN1) of the expansion device 200 via the connectors 114 and 214, and the voltage at the second input terminal T2 rises slowly to the voltage VIN1. Similarly, when the main device 100 is connected to the expansion device 200, the soft-start device 210 is coupled to the main battery device 102 (for example, the voltage VIN2) of the main device 100 through the connectors 114 and 214, and the voltage at the fourth input terminal T4 rises slowly to the voltage VIN2.

The main circuit section 112 is a system of the main device 100, and the functions of the main circuit section 112 are described in the following four conditions (1) to (4) based on the connection relationship of the main device 100 and the expansion device 200.

(1) First, the voltage of the auxiliary battery device 202 is considered to be higher than the voltage of the main battery device 102, and the voltage at the second input terminal T2 is higher than the reference voltage Vref. When the connector 114 and the connector 214 are connected to each other and the voltage at the second input terminal T2 is higher than the reference voltage Vref, the comparison device 106 controls the switch device 104 to enter an off-state. Since the switch device 104 is turned off, the power of the main battery device 102 cannot be provided to the first input terminal T1, such that the voltage at the first input terminal T1 becomes floating. Therefore, the voltage at the second input terminal T2 is higher than the voltage at first input terminal T1. The voltage at the second input terminal T2 is output to the output terminal OUT1 by the first voltage-directing device 108. In this manner, the main circuit section 112 receives the power supplied by the auxiliary battery device 202 through the connectors 114 and 214, the soft-start device 110 and the second diode D2.

When the connector 114 and the connector 214 are separated, the voltage at the second input terminal T2 drops, and when the voltage at the second input terminal T2 is lower than the reference voltage Vref, the comparison device 106 controls the switch device 104 to enter an on-state. The main battery device 102 supplies power to the main circuit section 112.

(2) Second, the voltage of the auxiliary battery device 202 is considered to be higher than the voltage of the main battery device 102, and the voltage at the second input terminal T2 is not higher than the reference voltage Vref. When the connector 114 and the connector 214 are connected to each other and the voltage at the second input terminal T2 is lower than or equal to the reference voltage Vref, the comparison device 106 controls the switch device 104 to enter an on-state, so that the first input terminal T1 receives power from the main battery device 102. Since the voltage of the auxiliary battery device 202 is higher than the voltage of the main battery device 102, the first diode D1 and the fourth diode D4 are regarded as an open circuit due to the reverse bias, and the voltage at the second input terminal T2 is output to the output terminal OUT1 by the first voltage-directing device 108 through the second diode D2. In this manner, the main circuit section 112 receives the power supplied by the auxiliary battery device 202 through the connectors 114 and 214, the soft-start device 110 and the second diode D2.

The voltage at the second input terminal T2 is lower than the reference voltage Vref, so that when the connector 114 and the connector 214 are separated, the comparison device 106 still controls the switch device 104 to enter the on-state and the main battery device 102 supplies power to the first input terminal T1. When the connector 114 and the connector 214 are separated, and when the voltage at the second input terminal T2 drops further to a level that is lower than the voltage at the first input terminal T1, the voltage at the first input terminal T1 is output to the output terminal OUT1 by the first voltage-directing device 108 and the main battery device 102 supplies power to the main circuit section 112.

(3) Then, the voltage of the main battery device 102 is considered to be higher than the voltage of the auxiliary battery device 202, and the voltage at the second input terminal T2 is higher than the reference voltage Vref. When the connectors 114 and 214 are connected to each other and the voltage at the second input terminal T2 is higher than the reference voltage Vref, the comparison device 106 controls the switch device 104 to be turned off (in the off-state). Since the switch device 104 is turned off, the power of the main battery device 102 cannot be provided to the first input terminal T1, such that the voltage at the first input terminal T1 becomes floating. Therefore, the voltage at the second input terminal T2 is higher than the voltage at first input terminal T1. The voltage at the second input terminal T2 is output to the output terminal OUT1 by the first voltage-directing device 108. In this manner, the main circuit section 112 receives the power supplied by the auxiliary battery device 202 through the connectors 114 and 214, the soft-start device 110 and the second diode D2.

When the connector 114 and the connector 214 are separated, the voltage at the second input terminal T2 drops, and when the voltage at the second input terminal T2 is lower than the reference voltage Vref, the comparison device 106 controls the switch device 104 to enter the on-state. The main battery device 102 supplies power to the main circuit section 112.

(4) Finally, the voltage of the main battery device 102 is considered to be higher than the voltage of the auxiliary battery device 202, and the voltage at the second input terminal T2 is lower than or equal to the reference voltage Vref. When the connector 114 and the connector 214 are connected to each other and the voltage at the second input terminal T2 is lower than or equal to the reference voltage Vref, the comparison device 106 controls the switch device 104 to enter the on-state and the main battery device 102 supplies power to the first input terminal T1. In addition, since the voltage of the main battery device 102 is higher than the voltage of the auxiliary battery device 202, the second diode D2 and the third diode D3 are regarded as an open circuit due to the reverse bias. The voltage at the first input terminal T1 is output to the output terminal OUT1 by the first voltage-directing device 108, to supply power to the main circuit section 112.

When the connector 114 and the connector 214 are separated, since the comparison device 106 already controls the switch device 104 to enter the on-state, the main battery device 102 supplies power to the first input terminal T1.

Similarly, the expansion device circuit section 212 is a system of the expansion device 200. When the main device 100 is connected to the expansion device 200, and when the voltage at the third input terminal T3 is higher than the voltage at the fourth input terminal T4, the second voltage-directing device 208 outputs the voltage at the third input terminal T3 to the output terminal OUT2, so that the expansion device circuit section 212 receives the power supplied by the auxiliary battery device 202 through the third diode D3. In addition, when the voltage at the third input terminal T3 is not higher than the voltage at the fourth input terminal T4, the second voltage-directing device 208 outputs the voltage at the fourth input terminal T4 to the output terminal OUT2, and the expansion device circuit section 212 receives the power supplied by the main battery device 102 through the switch device 104, the connectors 114 and 214, the soft-start device 210 and the fourth diode D4.

FIG. 2A is a block diagram of the soft-start device 110 shown in FIG. 1 according to an embodiment of the disclosure. The soft-start device 110 may comprise a P-type metal oxide semiconductor field effect transistor (MOSFET) 1021, a voltage divider comprising the two resistors R1 and R2, and a capacitor C1. By controlling the voltage VC1 across the capacitor C1, the user can control the change in the impedance RDS when the P-type MOSFET 1021 is turned on. In this manner, the function of gradually raising the voltage at the second input terminal T2 can be achieved when the soft-start device 110 receives the input voltage VIN1 (i.e., the voltage VIN1 shown in FIG. 1). In short, the voltage at the second input terminal T2 will slowly rise to the voltage VIN1 as the P-type MOSFET 1021 is turned on. In one embodiment of the disclosure, if there is no voltage or power loss during the voltage transfer (the auxiliary battery device 202, the connectors 114 and 214), the voltage VIN1 will gradually rise to the level of the voltage provided by the auxiliary battery device 202.

FIG. 2B is a block diagram of the soft-start device 210 shown in FIG. 1 according to an embodiment of the disclosure. The soft-start device 210 may consist of a P-type MOSFET 1022, a voltage divider comprising two resistors R3 and R4, and a capacitor C2. By controlling the voltage VC2 across the capacitor C2, the user can control the change in the impedance RDS when the P-type MOSFET 1022 is turned on. In this manner, the function of gradually raising the voltage at the fourth input terminal T4 can be achieved when the soft-start device 210 receives the input voltage VIN2 (i.e., the voltage VIN2 shown in FIG. 1). In short, the voltage at the fourth input terminal T4 will slowly rise to the voltage VIN2 as the P-type MOSFET 1022 is turned on. In one embodiment of the disclosure, if there is no voltage or power loss during the voltage transfer (the main battery device 102, the switch device 104, the first voltage-directing device 108 and the connectors 114 and 214), the voltage VIN2 will gradually rise to the level of the voltage provided by the main battery device 102.

Figure 3:
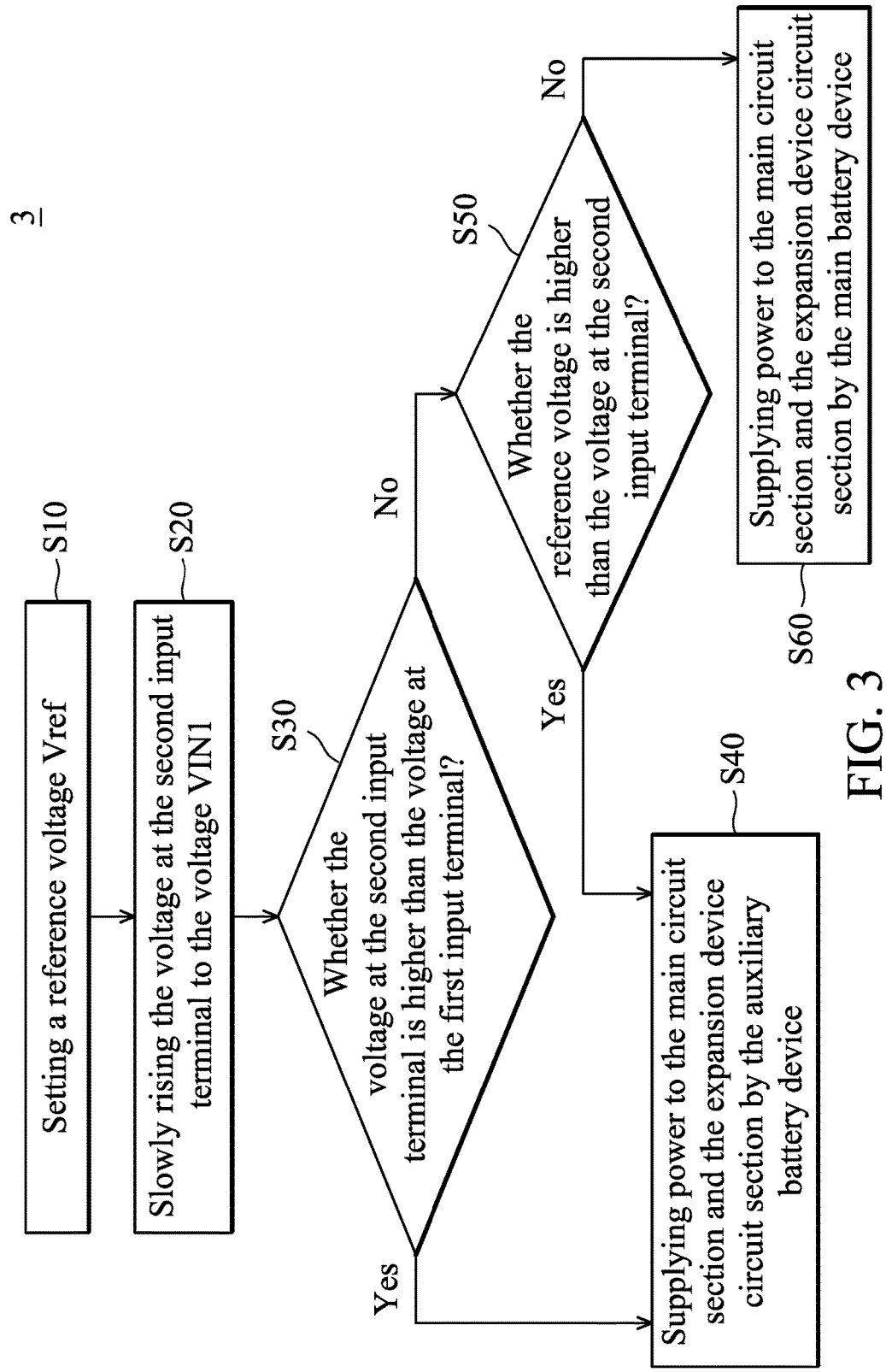
FIG. 3 shows a flow chart of a power supplying method of the electronic device 1 according to an embodiment of the invention.

FIG. 3 shows a flow chart of a power supplying method of the electronic device 1 according to an embodiment of the disclosure.

First of all, in step S10, a reference voltage Vref is set. Next, in step S20, the voltage at the second input terminal slowly rises to the voltage VIN1 (the rated voltage of the auxiliary battery device 202). Next, in step S30, the first voltage-directing device 108 determines whether the voltage at the second input terminal T2 is higher than the voltage at the first input terminal T1. When the first voltage-directing device 108 determines that the voltage at the second input terminal T2 is higher than the voltage at the first input terminal T1, it goes to step S40. In step S40, the auxiliary battery device 202 supplies power to the main circuit section 112 and the expansion device circuit section 212. When the first voltage-directing device 108 determines that the voltage at the second input terminal T2 is not higher than the voltage at the first input terminal T1, it goes to step S50. In step S50, the comparison device 106 determines whether the reference voltage is higher than the voltage at the second input terminal T2. When the reference voltage is higher than the voltage at the second input terminal T2, it goes to step S40. When the reference voltage Vref is lower than or equal the voltage at the second input terminal T2, it goes to step S60. In step S60, the main battery device 102 supplies power to the main circuit section 112 and the expansion device circuit section 212.

In the power supply method 3, the auxiliary battery device 202 can first discharge to a certain level according to the reference voltage Vref set by the user, and then the main battery device 102 discharges. In the embodiment of the disclosure, the reference voltage Vref is set to 5 volts (V), the rated voltage of the auxiliary battery device 202 is 9 volts (V), the rated voltage of the main battery device 102 is 12 volts (V). When the voltage at the second input terminal T2 rises slowly to 9 volts (V), the main circuit section 112 and the expansion device circuit section 212 are supplied with power by the auxiliary battery device 202. Then, if the auxiliary battery device 202 is continuously discharged to lower the voltage at the second input terminal T2 to under 5 volts (V), the main circuit section 112 and the expansion device circuit section 212 are supplied with power by the main battery device 102 instead. That is, the reference voltage Vref is a predetermined percentage of a value of the rated voltage of the auxiliary battery device 202. In some embodiments of the disclosure, the reference voltage Vref cannot be less than the minimum operating voltage of the main device 100.

Figure 4:
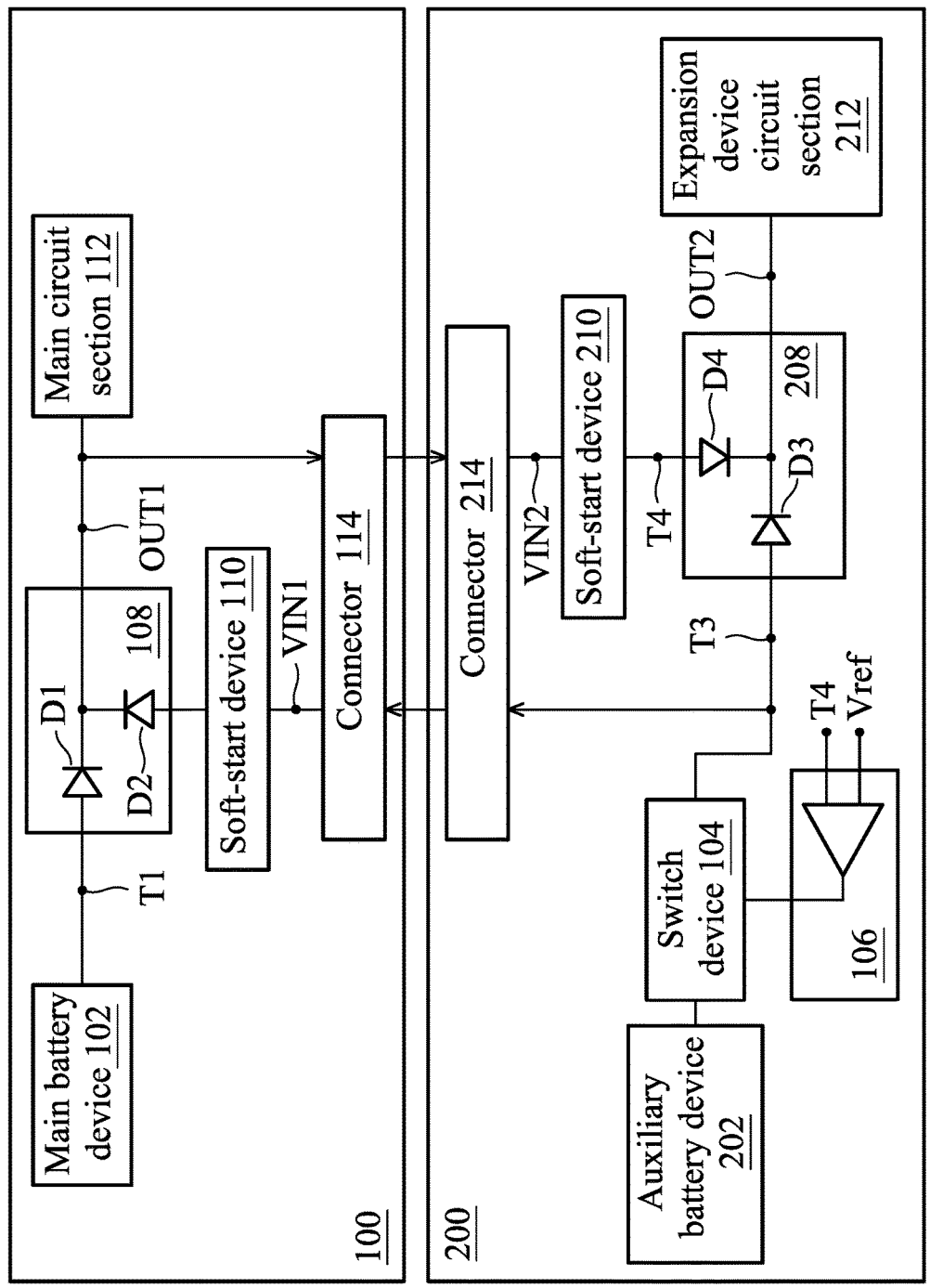
FIG. 4 shows a block diagram of an electronic device 4 according to another embodiment of the invention.

FIG. 4 shows a block diagram of an electronic device 4 according to another embodiment of the disclosure. The difference between the electronic device 4 shown in FIG. 4 and the electronic device 1 shown in FIG. 1 is in the position of the switch device 104 and the comparison device 106 (that is, the switch device 104 and the comparison device 106 are moved from the main device 100 and the expansion device 200). Operations of the electronic device 4 shown in FIG. 4 are the same as the electronic device 1 shown in FIG. 1. In this manner, the user can set the reference voltage Vref such that the main battery device 102 can discharge to a certain level first, and then the auxiliary battery device 202 discharges.

The operation and functions of the various logical blocks, modules, units, and circuits described in the invention may be implemented by using circuit hardware or embedded software code, which may be accessed and executed by a processor.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An electronic device, comprising:
a main device and an expansion device, wherein the main device is detachably connected to the expansion device, the expansion device comprises an auxiliary battery device,
the main device comprises:
a main battery device;
a voltage-directing device, comprising a first input terminal, a second input terminal and an output terminal, and configured to output, through the output terminal, a higher one of a voltage at the first input terminal and a voltage at the second input terminal;
a switch device, coupled to the main battery device and the first input terminal;
a first soft-start device, configured to connect to the auxiliary battery device and output a voltage to the second input terminal when the main device is connected to the expansion device; and
a comparison device, configured to receive the voltage at the second input terminal and a reference voltage, control the switch device to enter an off-state when the voltage at the second input terminal is higher than the reference voltage, and control the switch device to enter an on-state when the voltage at the second input terminal is not higher than the reference voltage.

2. The electronic device as claimed in claim 1, wherein the reference voltage is set to a predetermined percentage of a value of the minimum operating voltage of the main device or a rated voltage of the auxiliary battery device.

3. The electronic device as claimed in claim 1, wherein the voltage-directing device comprises:
a first diode; and
a second diode,
wherein a cathode of the first diode and a cathode of the second diode are coupled to the output terminal, and an anode of the first diode and an anode of the second diode are respectively coupled to the first input terminal and the second input terminal.

4. The electronic device as claimed in claim 3, wherein the main device further comprises a main circuit section, when the voltage at the second input terminal is higher than the reference voltage, the switch device is turned off and the auxiliary battery device supplies power to the main circuit section via the second diode; and when the voltage at the second input terminal is lower than or equal to the reference voltage, the switch device is turned on and the main battery device supplies power to the main circuit section via the first diode.

5. The electronic device as claimed in claim 4, wherein the expansion device further comprises a second soft-start device, connected to the output terminal of the voltage-directing device when the main device is connected to the expansion device, to supply power to the expansion device.

6. An electronic device detachably connected to an expansion device which comprises an auxiliary battery device, comprising:
 a main battery device;
 a voltage-directing device, comprising a first input terminal, a second input terminal and an output terminal, and configured to output, through the output terminal, a higher one of a voltage at the first input terminal and a voltage at the second input terminal;
 a switch device, coupled to the main battery device and the first input terminal;
 a soft-start device, configured to connect the auxiliary battery device and output a voltage to the second input terminal when the electronic device is connected to the expansion device; and
 a comparison device, configured to receive the voltage at the second input terminal and a reference voltage, control the switch device to enter an off-state when the voltage at the second input terminal is higher than the reference voltage, and control the switch device to enter an on-state when the voltage at the second input terminal is not higher than the reference voltage.

7. A power supplying method, suitable for a main device and an expansion device of an electronic device, wherein the expansion device comprises an auxiliary battery device, the main device comprises a main battery device, a switch device, a voltage-directing device, a comparison device and a first soft-start device, and the method comprises:
 outputting, through an output terminal of the voltage-directing device, a higher one of a voltage at a first input terminal of the voltage-directing device and a voltage at a second input terminal of the voltage-directing device;
 using the first soft-start device to connect to the auxiliary battery device and to output a voltage to the second input terminal when the main device is connected to the expansion device;
 using the comparison device to control the switch device to enter an off-state when the voltage at the second input terminal is higher than a reference voltage provided to the comparison device; and
 using the comparison device to control the switch device to enter an on-state when the voltage at the second input terminal is not higher than the reference voltage.

8. The method as claimed in claim 7, further comprising:
setting the reference voltage to a predetermined percentage of a value of the minimum operating voltage of the main device or a rated voltage of the auxiliary battery device.

9. The method as claimed in claim 7, further comprising:
turning off the switch device and using the auxiliary battery device to supply power to a main circuit section of the main device via a second diode of the voltage-directing device when the voltage at the second input terminal is higher than the reference voltage; and
turning on the switch device and using the main battery device to supply power to the main circuit section f the main device via a first diode of the voltage-directing device when the voltage at the second input terminal is lower than or equal to the reference voltage.

10. The method as claimed in claim 7, further comprising:
connecting a second soft-start device to the output terminal of the voltage-directing device when the main device is connected to the expansion device, to supply power to the expansion device.

* * * * *